United States Patent
Koesters et al.

(10) Patent No.: US 11,373,385 B2
(45) Date of Patent: Jun. 28, 2022

(54) PERSON RECOGNITION DEVICE AND METHOD

(71) Applicant: Robert Bosch GmbH, Stuttgart (DE)

(72) Inventors: Damian Koesters, Pfungstadt (DE); Gregor Blott, Salzgitter (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/553,281

(22) Filed: Aug. 28, 2019

(65) Prior Publication Data

US 2020/0074204 A1 Mar. 5, 2020

(30) Foreign Application Priority Data

Aug. 30, 2018 (DE) .................. 10 2018 214 699.3

(51) Int. Cl.
*G06K 9/20* (2006.01)
*G06K 9/00* (2022.01)
(Continued)

(52) U.S. Cl.
CPC .............. *G06V 10/143* (2022.01); *G06T 7/40* (2013.01); *G06T 7/97* (2017.01); *G06V 10/22* (2022.01);
(Continued)

(58) Field of Classification Search
CPC ........... G06K 9/00288; G06K 9/00369; G06K 9/2018; G06K 9/2054; G06K 9/4652;
(Continued)

(56) References Cited

U.S. PATENT DOCUMENTS 9,393,697 B1 * 7/2016 Beardsley ............ B25J 11/0005
2005/0222712 A1 * 10/2005 Orita ........................ G10L 15/26
700/246

(Continued)

FOREIGN PATENT DOCUMENTS

DE 102009027911 1/2011

OTHER PUBLICATIONS

Chuck, Camera selection for long range stereo vision system (up to 100 meters), StackExchange, https://robotics.stackexchange.com/questions/11839/camera-selection-for-long-range-stereo-vision-system-up-to-100-meters (Year: 2017).*

*Primary Examiner* — Joon Kwon
(74) *Attorney, Agent, or Firm* — Michael Best & Friedrich LLP

(57) ABSTRACT

Person recognition device for person re-identification in a monitoring region, having a camera apparatus and an evaluation module, wherein the camera apparatus comprises a first camera unit and a second camera unit, wherein the first camera unit is configured to record a first monitoring image of a portion of the monitoring region, wherein the second camera unit is configured to record a second monitoring image of the portion of the monitoring region, wherein the camera apparatus is configured to feed the first monitoring image and the second monitoring image to the evaluation module, wherein the evaluation module is configured to re-identify a person in the monitoring region based on the first monitoring image and the second monitoring image, wherein the second camera unit has a cut-off filter for wavelength cutting of incident light in a stop band.

14 Claims, 1 Drawing Sheet

(51) Int. Cl.

| | |
|---|---|
| *G06K 9/46* | (2006.01) |
| *G06T 7/40* | (2017.01) |
| *H04N 13/239* | (2018.01) |
| *G06T 7/00* | (2017.01) |
| *G06V 10/143* | (2022.01) |
| *G06V 10/22* | (2022.01) |
| *G06V 10/56* | (2022.01) |
| *G06V 40/10* | (2022.01) |
| *G06V 40/16* | (2022.01) |
| *H04N 13/00* | (2018.01) |

(52) U.S. Cl.
CPC ............ *G06V 10/56* (2022.01); *G06V 40/103* (2022.01); *G06V 40/172* (2022.01); *H04N 13/239* (2018.05); *G06T 2207/10012* (2013.01); *G06T 2207/10048* (2013.01); *G06T 2207/20224* (2013.01); *H04N 2013/0074* (2013.01)

(58) Field of Classification Search
CPC . G06T 2207/10012; G06T 2207/10048; G06T 2207/20224; G06T 7/40; G06T 7/97; H04N 13/239; H04N 2013/0074
See application file for complete search history.

(56) References Cited

U.S. PATENT DOCUMENTS

| | | | |
|---|---|---|---|
| 2006/0034537 A1* | 2/2006 | Masaki | G06K 9/00362 382/254 |
| 2006/0056667 A1* | 3/2006 | Waters | G06K 9/00255 382/118 |
| 2006/0210146 A1* | 9/2006 | Gu | G01B 11/25 382/154 |
| 2012/0114194 A1* | 5/2012 | Kim | G06K 9/00255 382/115 |
| 2012/0179280 A1 | 7/2012 | Faye | |
| 2017/0308757 A1* | 10/2017 | Nguyen | H04L 12/4625 |

* cited by examiner

PERSON RECOGNITION DEVICE AND METHOD

BACKGROUND OF THE INVENTION

Person recognition device for re-identifying persons in a monitoring region, having a camera apparatus and an evaluation module, wherein the camera apparatus comprises a first camera unit and a second camera unit, wherein the first camera unit is configured to record a first monitoring image of a portion of the monitoring region, and the second camera unit is configured to record a second monitoring image of the portion of the monitoring region, wherein the camera apparatus is configured to provide the first monitoring image and the second monitoring image to the evaluation module.

The demand for person re-identification (PRID) algorithms and apparatuses for video monitoring technology has increased enormously in recent years. Persons in the near range of cameras can be re-identified with a high degree of accuracy by way of their faces (face recognition). In the expanded near range or in the far range, such algorithms based on face recognition cannot operate robustly because in particular the imaging of the faces in the image is too small for re-identification and furthermore the persons do not always look directly into cameras. It is furthermore difficult to deal with obscuration due to other persons, baby carriages, wheelchairs or building parts in re-identification algorithms. This could be remedied by camera lenses having a larger focal length, but this greatly reduces the monitoring region.

Document DE 10 2009 027 911 A1, which probably forms the closest prior art, describes a system for perceiving at least one person in an environment of a motor vehicle. The system comprises at least one generator for producing an audio signal, a device for switching the generator on and off and/or for controlling the volume of the audio signal. The system furthermore has a person recognition system with which a person and/or an object in the environment of the motor vehicle is capturable and the at least one generator is able to be switched on and/or off by the device in dependence on the at least one person and/or the object and the volume of the audio signal is controllable in this way.

SUMMARY OF THE INVENTION

A person recognition device for person re-identification in a monitoring region is provided. Furthermore, a method for monitoring a monitoring region is provided. Preferred and/or advantageous configurations of the invention result from the dependent claims, the description, and the attached figures.

Proposed is a person recognition device for person re-identification in a monitoring region. In particular, the person recognition device is for person re-identification in an interior region, alternatively in an exterior region. For example, the monitoring region is an interior space, such as an airport or a train station, or an exterior space region such as a park or public streets. It is in particular possible using the person recognition device to search for and/or to re-locate a person that is present, a person that is sought, or a person determinable by similarity in the monitoring region. A user can focus in particular quickly on relevant regions and/or segments of the data and/or of the monitoring region where the person was re-located using the person recognition device.

The person recognition device has a camera apparatus. The camera apparatus has a first camera unit and a second camera unit. In particular, the first camera unit and the second camera unit can be arranged in a common housing. The first camera unit and the second camera unit are preferably offset relative to one another by a base length. In particular, the first camera unit and the second camera unit are arranged such that they monitor a scene and/or a portion of the monitoring region from different perspectives. The first camera unit is configured to record a first monitoring image and/or a sequence of first monitoring images of a portion of the monitoring region. The second camera unit is configured to record a second monitoring image and/or a sequence of second monitoring images of the portion of the monitoring region. In particular, the first monitoring image and/or the second monitoring image can record and/or image a region of the monitoring region that is greater than the portion. The first monitoring image and the second monitoring image have a common overlap of an imaged partial amount of the monitoring region which forms in particular the portion of the monitoring region. The first camera unit and/or the second camera unit are preferably digital cameras. The first camera unit and the second camera unit are embodied, specifically, in the form of color cameras. Specifically, the first camera unit and/or the second camera unit can be sensitive in the near infrared range, in the infrared range, or in the UV range. The first monitoring image and/or the second monitoring image in particular form a color image, but can also have an extra infrared pixel.

The person recognition device has an evaluation module. The evaluation module can be embodied in the form of a hardware or software module. In particular, the evaluation module is formed by a computational unit. Specifically, the evaluation module forms a central evaluation module, wherein the evaluation module is connected for example to a plurality of camera apparatuses. The camera apparatus is configured to provide the first monitoring image and the second monitoring image to the evaluation module. To this end, the camera apparatus and the evaluation module are connected to one another by way of a data link, for example via a radio link, alternatively via a wired connection. Specifically, the first monitoring image and the second monitoring image are fed to the evaluation module by a plurality of camera apparatuses.

The evaluation module is configured to re-identify a person in the monitoring region based on the first monitoring image and the second monitoring image. In particular, the evaluation module can be configured to generate an intermediate image from the first monitoring image and the second monitoring image and to re-identify, based on the intermediate image, the person in the monitoring region. For example, a person that is to be re-identified is input in and/or fed to the person recognition device and/or the evaluation module, which may be effected for example by way of an input apparatus which the person recognition device optionally comprises. The evaluation module is configured for example to search for the person that is to be re-identified in the first monitoring image and/or the second monitoring image and/or the intermediate image and/or to search therein for features of the person that is to be re-identified. Specifically, the evaluation module can be configured to output, upon re-identification of the person that is to be re-identified, the monitoring image with the re-identified person on an output unit, such as a monitor.

According to the invention, the second camera has a cut-off filter. The cut-off filter is configured for cutting off wavelengths of incident light. The wavelength cutting takes place in a stop band. For example, the cut-off filter is arranged upstream of the objective lens of the second camera unit. The cut-off filter is preferably embodied in the form of a reflective cut-off filter. The cut-off filter can be, for example, a color filter and/or conversion filter. Furthermore, the cut-off filter can be a UV cut-off filter or an effect filter. The stop band can be an open wavelength range, for example upwardly or downwardly open; alternatively, the stop band can be a closed wavelength interval, for example of 200-250 nanometers.

The invention is based on the idea that person recognition is based on two different monitoring images, of which one monitoring image is cut in the wavelength range by way of a cut-off filter.

According to one configuration of the invention, the evaluation module is configured to generate a channel image (difference image) of the portion based on the first monitoring image and the second monitoring image. The channel image in particular shows the portion of the monitoring region in the wavelength range of the stop band. For example, the evaluation module is configured to generate the channel image by way of, in particular intelligent, subtraction between the first monitoring image and the second monitoring image; specifically, the subtraction can represent a weighted subtraction between the two monitoring images. Intelligent subtraction is understood to mean that identical regions from the object space are transformed or registered to identical regions in the image space. Owing to the spatial distance between the cameras, this adaptation is necessary so as not to compare different regions to one another.

The evaluation module is here configured to re-identify the person in the portion based on the channel image. For example, re-identification features of the person in the wavelength range of the stop band are particularly easily recognizable and therefore easy to re-locate in the channel image. This configuration is based on the idea that the resulting colors in the images form over an integral of the spectral sensitivity and it is possible on account of the setup described to generate, by pixel-related registration of the two monitoring images and subsequent subtraction, a channel image that corresponds in particular almost completely to the portion in the stop band.

It is particularly preferred that the cut-off filter is an infrared cut-off filter. The infrared cut-off filter is preferably an interference filter and/or a dichroic filter. Using the infrared cut-off filter, incidence in particular of infrared light on and/or into the second camera unit is ruled out. Specifically, the infrared cut-off filter is a cut-off filter for the near infrared range. With particular preference, the infrared cut-off filter is a cut-off filter that filters out light having a wavelength of greater than 700 nanometers. Alternatively and/or additionally, the infrared filter can be an infrared filter for the near infrared range IR-B, which filters out infrared light having a wavelength of greater than 1.4 micrometers. In this configuration, the channel image forms an IR channel image and/or an NIR channel image. The IR and/or NIR channel image shows the portion of the monitoring region as an NIR image or as an IR image. This configuration is based on the idea that fabrics, in particular textile fabrics, scatter color components in particular into the IR range. In particular, it is also possible to easily utilize IR and NIR light to the effect that it enhances the imaging quality in the monitoring camera and blur or color washing can be reduced. It is furthermore a consideration of this configuration that a multiplicity of pigments are quasi transparent in the NIR and/or IR range. Many pigments exhibit no absorption or only little absorption in the NIR and IR range. This in particular results in NIR images and/or IR images comprising more information relating to the material and/or the texture. Owing to the transparency of color pigments in the IR and NIR range, such images are more uniform and/or more consistent within one material and/or one range. It is thus possible to determine information relating to the material using NIR and/or IR images. Furthermore, the texture forms an intrinsic variable in the NIR and/or IR images. Since many colorants and/or pigments are transparent in the NIR and/or IR range, the texture in this wavelength range is easier to determine. Furthermore, an NIR and/or IR image is characterized by a stronger contrast.

It is particularly preferred that the camera apparatus forms a stereo camera. The stereo camera is in particular configured for stereoscopically evaluating the portion in the monitoring region and/or the evaluation module is configured to generate a stereo image based on the first monitoring image and the second monitoring image. The first monitoring image and the second monitoring image specifically form stereoscopic half images. Specifically, the first camera unit and the second camera unit are located at a distance from one another, at what is known as a base length. By arranging the first camera unit and the second camera unit at a distance of the base length from one another, the first monitoring image and the second monitoring image show the portion of the monitoring region from different perspectives. In particular, the evaluation module is configured to be able to perform, based on the stereo image and/or the stereoscopic evaluation, a spatial impression and/or a spatial evaluation of the portion in the monitoring region. In particular, distances of objects in the portion are able to be determined in relation to one another. Furthermore, the evaluation module can be configured to track a person and/or an object in the monitoring region based on the stereoscopic evaluation and/or the stereo image.

It is particularly preferred that the evaluation module is configured to re-identify the person in the monitoring region and/or in the portion of the monitoring region based on the stereo image and/or the stereoscopic evaluation. In particular, the evaluation module can be configured to re-identify the person in the monitoring region and/or portion based on the stereoscopic evaluation and/or tracking of the person from previous recordings and/or monitoring images. For example, the tracking indicates that the person is likely to move in a specific direction, wherein the evaluation module can restrict the region in which a search for the person is preferably performed on the basis of said information. This configuration is based on the idea of providing a reliable possibility of person re-identification and to be able to generate as many pieces of information from the monitoring images as possible.

Optionally, the monitoring region and/or the portion of the monitoring region form an expanded near range and/or a far range of the camera apparatus, of the first camera unit and/or of the second camera unit. A near range is understood to mean in particular a region at a distance from the camera of between one and ten meters. An expanded near range is understood to mean for example a region at a distance from the camera from five to fifteen meters. A far range is understood to mean a region at a distance from the camera unit and/or camera apparatus that is located between nine and thirty meters away. Furthermore, the far range can comprise a super-far range and/or be supplemented thereby, said super-far range having a distance from the camera unit and/or camera apparatus that is greater than twenty meters. This configuration is based on the consideration that it is possible in this way to monitor a large region, in particular cost-effectively and with little material outlay, using the person recognition device and the person can be re-identified therein. It is furthermore a consideration of the invention that faces in the far range and/or in the expanded near range are hardly capable of being recognized and/or are able to be evaluated with difficulty, and re-identification of the person continues to be possible by the use of two cameras and a filter in the camera.

It is particularly preferred that the evaluation module is configured to re-identify the person on the basis of color features. The color feature is understood to mean for example colored areas and/or color intensities in the first monitoring image, in the second monitoring image and/or in the channel image. Furthermore, the color feature can be interpreted to be a wavelength distribution. Color features can also comprise contrasts and/or color progressions. Say, it is known that the person that is to be re-identified is wearing a red T-shirt and the red lies in a specific color and/or wavelength range, by searching for this wavelength and/or this hue, the person in the monitoring region can be re-identified.

It is particularly preferred that the evaluation module is configured to re-identify the person based on texture and/or textile features. In particular, the evaluation module is configured to examine the monitoring images and specifically the channel image for texture features and/or textile features. In particular, it is a consideration that texture information is particularly easily recognizable in the channel image, in particular in the IR image, because such an image can be imaged particularly well. Texture features are in particular understood to be regions in the monitoring images and/or in the channel image that describe a structure and/or characteristic. In particular, texture features are understood to be properties that relate to coarseness, contrast, directionality of the line similarity, the regularity and/or the coarseness. In particular, different materials have different texture and/or textile features that can be used to re-identify the person.

The evaluation module is specifically configured to determine the texture features, the textile features and/or the color features in the channel image and to re-identify the person based thereon. In the channel image, texture features, textile features and/or color features are imaged and/or able to be evaluated particularly well. Specifically, the texture determination is particularly advantageous in the IR image which forms the channel image.

According to one configuration of the invention, the evaluation module is configured to segment the first monitoring image, the second monitoring image and/or the channel image. Segmenting is in particular understood to mean that the monitoring image and/or the channel image is to be divided into regions that are associated in terms of content, structure and/or color. For example, the evaluation module is configured to segment regions in the monitoring image and/or in the channel image into a common region when they have a same color, a same structure, texture or other corresponding information. It is particularly preferred that the evaluation module is configured to segment, in the first monitoring image, in the second monitoring image and/or in the channel image, a region on which a person can be seen. For example, the person can be segmented on the basis of information that describes the geometry, the behavior and/or the size of a person. Furthermore, the evaluation module is for example configured to determine and/or segment a clothing region, wherein the clothing region is a partial region of the monitoring image and/or of the channel image. The clothing region for example describes a sweater, T-shirt and/or pants region of the segmented person. Specifically, the evaluation module is configured to perform the person re-identification based on the clothing region and/or the segmented person. For example, the evaluation module is configured to examine the clothing regions for texture features, textile features and/or color features and to re-identify the person, if possible, based thereon.

According to one configuration of the invention, the evaluation module has and/or comprises fabric and/or texture data in and/or as a reference database. Structure properties, fabric properties and/or texture properties of various materials and/or fabrics are stored in the reference database. For example, the fabric and/or texture properties comprise information relating to the absorption behavior and/or reflection behavior in different wavelength ranges. The texture data comprise for example information relating to how a fabric and/or a textile will typically appear in monitoring images and/or channel images. The evaluation module is configured in particular to re-identify the person based on the reference database, the first monitoring image, the second monitoring image and/or the channel image. In particular, it is possible for a user to set in the person recognition device the fabric the person is wearing, wherein the person is then re-identifiable using the evaluation module.

In particular, the fabric and/or texture data comprise information relating to the reflection behavior of the fabric, the texture and/or colors in the spectral range. In particular, this configuration is based on the consideration that many fabrics and textiles reflect the colors into the stop band, in particular in the IR range, with the result that the person is re-identifiable particularly easily based on the channel image.

It is particularly preferred that the evaluation module is configured to re-identify the person based on facial features and/or in the channel image. This configuration is based on the consideration that the imaging is particularly sharp and of high contrast in the channel image, in particular as IR and/or as NIR image, that facial features can here be used well for the re-identification of the person, in particular also in the expanded near range.

Further subject matter of the invention is a method for re-identification of a person in a monitoring region. To this end, a first monitoring image of a portion of the monitoring region is recorded using a first camera unit. A second monitoring image of the portion of the monitoring region is recorded using a second camera unit. In particular, the portion of the monitoring region is recorded from different perspectives using the first camera unit and the second camera unit. The second monitoring image is recorded with a cut-off filter, with the result that the second monitoring image is cut in the recorded and/or imaged wavelength range. Based on the first monitoring image and the second monitoring image, a person that is to be re-identified is determined in the portion and/or searched for in the portion. In particular, a channel image is to be generated from the first monitoring image and the second monitoring image, for example by subtraction, wherein the channel image shows the portion of the monitoring region in the wavelength range of the stop band. A search for the person is then in particular performed and/or the person is re-identified based on the channel image.

BRIEF DESCRIPTION OF THE DRAWINGS

Preferred and/or advantageous configurations are apparent from the attached figures and the descriptions thereof. In the figures.

DETAILED DESCRIPTION

Figure 1:
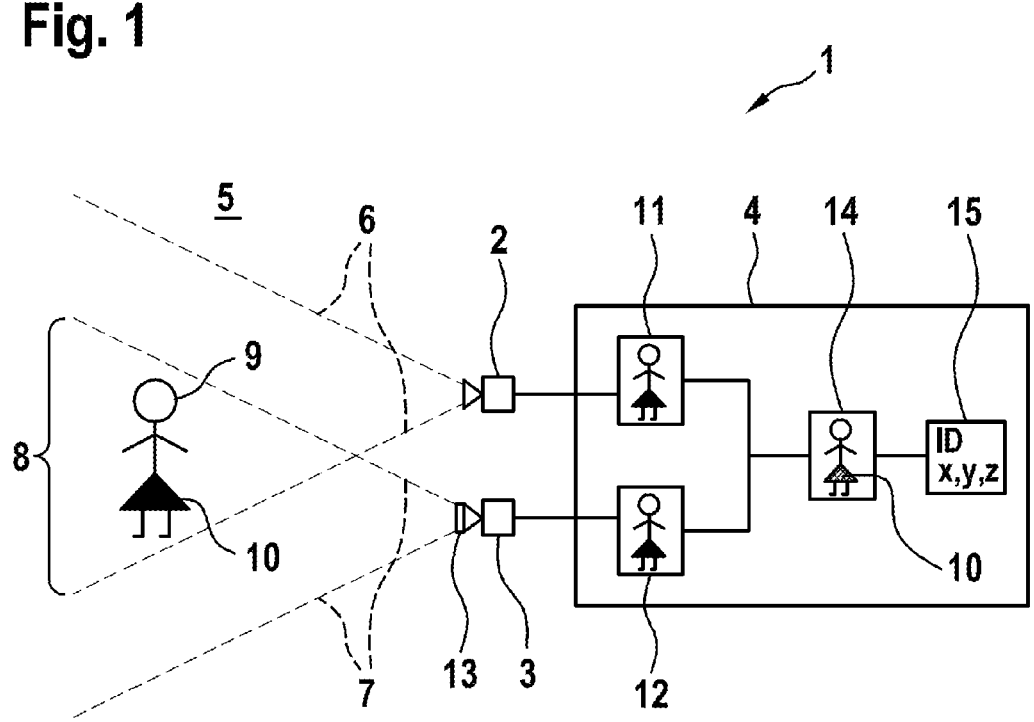
FIG. 1 shows an exemplary embodiment of the person recognition device.

FIG. 1 schematically shows a person recognition device 1. The person recognition device 1 has a first camera unit 2 and a second camera unit 3 and also an evaluation module 4. The first camera unit 2 and the second camera unit 3 form a camera apparatus, wherein the two camera units can be arranged in a common housing, or can be, as is the case here, be installed separately and/or attached separately. The first camera device 2 and the second camera device 3 are configured for monitoring a monitoring region 5 using image technology, in particular video technology. The monitoring region 5 is preferably an interior region, for example a train station or an airport. Alternatively, the monitoring region 5 can be an exterior region, for example a park area or a street, wherein in this case the first camera unit 2 and the second camera unit 3 are in particular configured to be weather-resistant and/or waterproof.

The first camera unit 2 and the second camera unit 3 are embodied in the form of digital cameras and form color cameras. In particular, the first camera unit 2 and the second camera unit 3 have an image sensor each, which can convert incident light into an image. The first camera unit 2 has an aperture angle 6, wherein the aperture angle 6 is determined in particular by the objective lens. The camera unit 2 is configured to image a region of the monitoring region 5, wherein said region is located within the aperture angle 6. The second camera unit 3 likewise has an aperture angle 7, wherein this aperture angle is also determined in particular by an objective lens of the second camera unit 3. The second camera unit 3 is configured to image a part of the monitoring region 5 which is located within the aperture angle 7. In particular, in each case a region of the monitoring region 5 that is located in the far range is imaged by the first camera unit 2 and the second camera unit 3. The first camera unit 2 and the second camera unit 3 are arranged such that they image an overlapping region and/or a common region in the monitoring region 5, wherein said region forms the portion 8. A person 9 that is to be re-identified and/or tracked in the monitoring region is located in the portion 8 of the monitoring region 5. The person 9 in particular is wearing an item of clothing 10, in the present case a skirt, which is determined by a textile, in particular with texture and color features.

The first camera unit 2 and the second camera unit 3 are connected to the evaluation module 4 by way of a data link. The evaluation module 4 in particular forms a central evaluation module in the form of a computational unit. The first camera unit 2 is configured for recording a first monitoring image 11, which in particular shows and/or images the portion 8 with the person 9. The second camera unit 3 is configured for recording a second monitoring image 12, wherein the second monitoring image 12 shows the portion 8 with the person 9. The first monitoring image and the second monitoring image 12 are fed to the evaluation module 4.

The second camera unit 3 has a cut-off filter 13. The cut-off filter 13 is in particular formed by an IR filter. The cut-off filter 13 is arranged for example in the objective lens of the camera device 3. The cut-off filter 13 filters out a wavelength range from the incident light, wherein the stop band is filtered out. In particular, the stop band is an infrared range, which means that for example wavelengths having a wavelength of greater than 700 nanometers are cut out and/or filtered by the cut-off filter. The second monitoring image 12 thus shows the portion 8 with the person 9 in a cut wavelength range, wherein in particular the stop band does not contribute to the image formation. The first monitoring image 11 and the second monitoring image 12 thus form mixed image data. The evaluation module 4 is configured to generate a channel image 14 based on the first monitoring image 11 and the second monitoring image 12. The channel image 14 is formed for example by means of a subtraction between the first monitoring image 11 and the second monitoring image 12. The channel image 14 thus shows the portion 8 and/or the person 9 in the light of the stop band and specifically forms an NIR image or an IR image. By way of this subtraction, in particular in the NIR range and/or in the IR range, structures, textures and/or color properties of the item of clothing 10 become particularly clear. The evaluation module 4 is configured to re-identify and/or re-locate the person 9 based on the channel image 14. In particular, the texture of the item of clothing 10 in the channel image is evaluated to this end. The texture, in particular patterns, is particularly easily recognizable in the channel image 14. The evaluation module 4 is thus configured to recognize the person 9 and to provide said person for example as a re-identification dataset 15, wherein the re-identification dataset 15 has for example an ID or a name of the person 9 and/or the position at which the person 9 was found.

In particular, the evaluation module 4 can also be configured to stereoscopically and/or stereometrically evaluate the portion 8 based on the first monitoring image 11 and the second monitoring image 12 and to generate for example a spatial view or a spatial image of the portion 8. For example, the evaluation module 4 can thus determine distances in the portion 8 and better or more precisely determine the position of the person.

Figure 2:
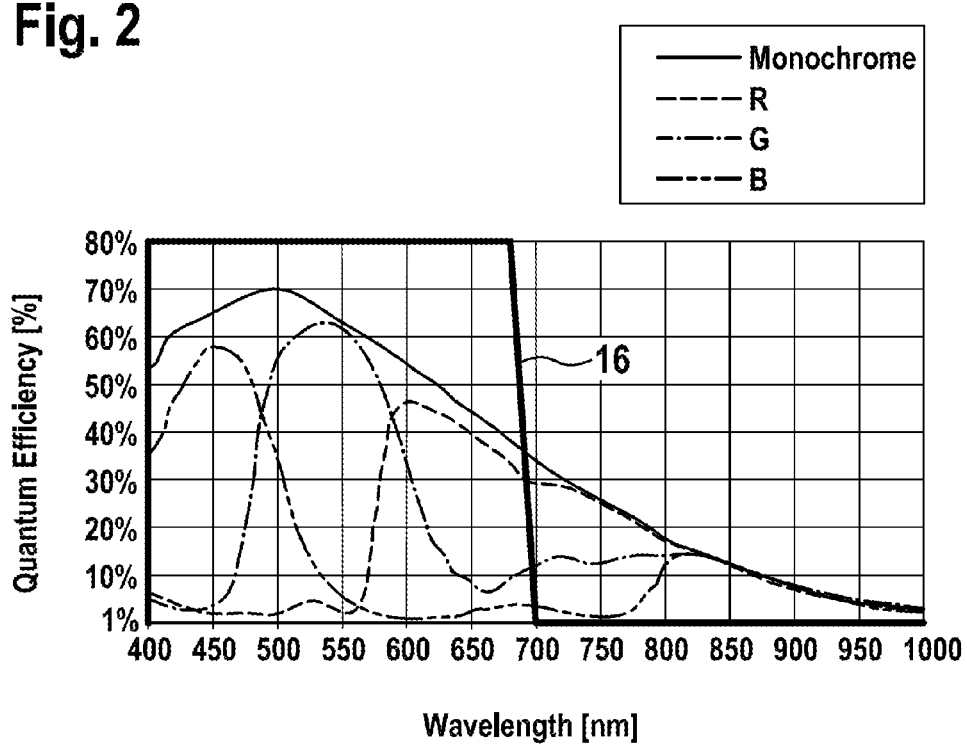
FIG. 2 shows a wavelength distribution and stop band as an exemplary embodiment.

FIG. 2 schematically shows the quantum yields of a detector, wherein this type of detector is used in particular in the first camera unit 2 and/or the second camera unit 3. The diagram shows the quantum efficiencies, or quantum yields, for the different sensors R, G, B. While the sensor B has a maximum quantum yield at approximately 450 nanometers, the sensor G has a maximum quantum yield in the range between 500 and 550 nanometers, and the sensor R has a maximum yield at approximately 600 nanometers. All three sensors R, G, B have a quantum yield in the IR range that differs from 0, which can be determined as greater than 700 nanometers here. In this way, a part of the IR light is also interpreted as red-green or blue light in the recording of an image without an IR filter. Also shown is the cutting region 16 that is defined by the cut-off filter 13. It is apparent here that by using the cut-off filter 13, the wavelength range of greater than 700 nanometers is cut out and does not contribute to the recording. Based on this cutting, it is possible to produce an almost IR image 14 by subtraction between the first monitoring image and the second monitoring image 12; assuming the images were previously registered with respect to one another.

The invention claimed is:

1. A person recognition device (1) for person re-identification in a monitoring region (5), having a camera apparatus and an evaluation module (4), wherein the camera apparatus comprises a first camera unit (2) and a second camera unit (3), wherein the first camera unit (2) is configured to record a first monitoring image (11) of a portion (8) of the monitoring region (5) in a visible range and an infrared range, wherein the second camera unit (3) is configured to record a second monitoring image (11) of the portion (8) of the monitoring region (5) in the visible range, the second camera unit (3) including a cut-off filter (13) configured to filter out the infrared range in recording the second image, wherein the camera apparatus is configured to feed the first monitoring image (11) and the second monitoring image (12) to the evaluation module (4), wherein the evaluation module (4) is configured to generate a difference image of the first image and the second image by performing a weighted subtraction between the first monitoring image (11) and the second monitoring image (12), the weighted subtraction including transforming identical regions from an object space into identical regions in an image space, re-identify a person (9) in the monitoring region (5) based on a difference image of the portion (8) of the monitoring region (5) in the infrared range, the difference image being produced from the first monitoring image (11) and the second monitoring image (12), and to re-identify the person (9) based on textile features.

2. The person recognition device (1) according to claim 1, wherein a channel of the difference image of the portion (8) is in a stop band of the cut-off filter.

3. The person recognition device (1) according to claim 2, wherein the cut-off filter (13) forms an infrared cut-off filter and the difference image forms an IR channel image.

4. The person recognition device (1) according to claim 1, wherein the camera apparatus forms a stereo camera for stereoscopic evaluation and/or the evaluation module (4) is configured to generate a stereo image based on the first monitoring image (11) and the second monitoring image (12).

5. The person recognition device (1) according to claim 4, wherein the evaluation module (4) is configured to re-identify the person (9) in the monitoring region (5) based on the stereo image and/or the stereoscopic evaluation.

6. The person recognition device (1) according to claim 1, wherein the monitoring region (5) and/or the portion (8) of the monitoring region (5) forms an expanded near range and/or far range.

7. The person recognition device (1) according to claim 1, wherein the evaluation module (4) is configured to re-identify the person (9) based on color features.

8. The person recognition device (1) according to claim 1, wherein the evaluation module (4) is configured to segment a person (9) in the first monitoring image (11), in the second monitoring image (12) and/or in a channel image (14) and to determine a clothing region and re-identify the person (9) based on the clothing region.

9. The person recognition device (1) according to claim 1, wherein the evaluation module (4) has fabric and/or texture data in a reference database.

10. The person recognition device (1) according to claim 9, wherein the fabric and/or texture data comprise information relating to a reflection behavior of the fabric of colors into a stop band of the cut-off filter.

11. The person recognition device (1) according to claim 1, wherein the evaluation module (4) is configured to re-identify the person (9) based on facial features and the difference image.

12. A method for re-identification of a person (9) in a monitoring region (5), wherein a first monitoring image (11) of a portion (8) of the monitoring region (5) is recorded in a visible range and an infrared range using a first camera unit (2) and a second monitoring image (12) of the portion (8) of the monitoring region (5) is recorded in the visible range using a second camera unit (3), wherein the second monitoring image (12) is recorded with a cut-off filter (13) configured to filtering out the infrared range in recording the second image, wherein a person (9) that is to be re-identified is determined in the portion (8) and/or a search for a person (9) that is to be re-identified is performed in the portion (8) based on a difference image of the portion (8) of the monitoring region (5) in the infrared range, the difference image being produced from the first monitoring image (11) and the second monitoring image (12), and wherein the difference image of the first image and the second image is generated by performing a weighted subtraction between the first monitoring image (11) and the second monitoring image (12), the weighted subtraction including transforming identical regions from an object space into identical regions in an image space.

13. The method of claim 12, wherein the person (9) is located more than twenty meters away from the device (1).

14. The person recognition device of claim 1, wherein the person (9) is located more than twenty meters away from the device (1).

* * * * *